US010682574B2

(12) United States Patent
Nishi et al.

(10) Patent No.: US 10,682,574 B2
(45) Date of Patent: Jun. 16, 2020

(54) IMMERSIVE GAMING

(71) Applicant: Intel Corporation, Santa Clara, CA (US)

(72) Inventors: Yoshifumi Nishi, Beverton, OR (US); Jessica Gullbrand, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 755 days.

(21) Appl. No.: 15/078,821

(22) Filed: Mar. 23, 2016

(65) Prior Publication Data
US 2017/0274282 A1  Sep. 28, 2017

(51) Int. Cl.
A63F 13/53    (2014.01)
A63F 13/25    (2014.01)
A63F 13/245   (2014.01)
A63F 13/24    (2014.01)
A63F 13/537   (2014.01)
A63F 13/837   (2014.01)

(52) U.S. Cl.
CPC .............. A63F 13/53 (2014.09); A63F 13/24 (2014.09); A63F 13/245 (2014.09); A63F 13/25 (2014.09); A63F 13/537 (2014.09); A63F 13/837 (2014.09); A63F 2300/8082 (2013.01)

(58) Field of Classification Search
CPC .............................. A63F 13/25; G02B 27/017
See application file for complete search history.

(56) References Cited

U.S. PATENT DOCUMENTS 8,836,274 B2    9/2014  Evans et al.
2002/0074370 A1* 6/2002 Quintana .................. A45F 3/14
                                                224/262
2005/0138218 A1  6/2005  Chen
2008/0072083 A1  3/2008  Weststrate et al.
(Continued)

FOREIGN PATENT DOCUMENTS

KR    101035034    5/2011
KR    101054817    8/2011

OTHER PUBLICATIONS

"International Application Serial No. PCT/US2017/018911, International Search Report dated May 29, 2017", 3 pgs.
(Continued)

Primary Examiner — Jay Trent Liddle
(74) Attorney, Agent, or Firm — Schwegman Lundberg & Woessner, P.A.

(57) ABSTRACT

Various systems and methods for providing immersive gaming are provided herein. A portable computing system for providing an immersive experience comprises a display; a graphics unit to present the immersive experience to a user on the display; a communication subsystem to determine a resource level of a resource coupled to the portable computing system; wherein the graphics unit is to present a representation of the resource level to the user in the immersive experience; wherein the communication subsystem is to: detect that the resource was replaced with a replacement resource, the replacement caused by a real-world interaction with the resource by the user; and determine a replacement resource level of the replacement resource; and wherein the graphics unit is to present a representation of the replacement resource level in the immersive experience on the display.

21 Claims, 9 Drawing Sheets

(56) References Cited

U.S. PATENT DOCUMENTS

| | | | |
|---|---|---|---|
| 2015/0379351 A1* | 12/2015 | Dibenedetto | G06K 9/00671 |
| | | | 345/633 |
| 2016/0054837 A1* | 2/2016 | Stafford | G06F 3/012 |
| | | | 463/33 |
| 2016/0077337 A1* | 3/2016 | Raffle | G06F 3/013 |
| | | | 345/156 |
| 2016/0109931 A1* | 4/2016 | Kobayashi | G06F 1/3265 |
| | | | 345/212 |
| 2017/0154005 A1* | 6/2017 | Ahmed | G06F 13/4081 |

OTHER PUBLICATIONS

"International Application Serial No. PCT/US2017/018911, Written Opinion dated May 29, 2017", 7 pgs.

* cited by examiner

IMMERSIVE GAMING

TECHNICAL FIELD

Embodiments described herein generally relate to gaming interfaces apparatus and in particular, to immersive gaming.

BACKGROUND

Augmented reality (AR) viewing may be defined as a live view of a real-world environment whose elements are supplemented (e.g., augmented) by computer-generated sensory input such as sound, video, graphics, or haptic feedback. Virtual reality (VR) takes AR one step further and provides a fully immersive virtual world for the user. A head-mounted display (HMD), also sometimes referred to as a helmet-mounted display, is a device worn on the head or as part of a helmet that is able to project images in front of one or both eyes of a user. An HMD may be used for various applications including augmented reality or virtual reality simulations. HMDs are used in a variety of fields such as military, gaming, sporting, engineering, and training.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Head-mounted displays (HMDs) use significant computing power to run. The computing power requires a large capacity battery to obtain reasonable wireless operation (e.g., untethered from main power). Multiple batteries may be used to further increase battery capacity, but such configurations may encumber the user or detract from the immersive nature of AR or VR experience.

In many AR or VR experiences the user consumes resources within the experience, which may need to be replenished as part of the ongoing experience. For example, in a gaming context a user may fire a gun or operate a vehicle, where the gun expends rounds or the vehicle expends fuel. In order to continue playing the user periodically reloads the weapon or refuels the vehicle. Various actions may cause the reload or refuel, for example, maneuvering the virtual vehicle to pass over a refuel pod or to touch a button on a controller to reload a weapon. These actions are unnatural and remove some of the immersive nature of the experience. What is needed is a mechanism to enhance the virtual experience and maintain immersion in the environment.

Systems and methods described herein implement immersive gameplay. Although the examples included in this document primarily refer to gaming and game play, it is understood that the same or similar functionality may be implemented with other AR or VR experiences, such as shopping, virtual traveling, social media interactions, teleconferences, or the like. In general, a real world depletable or consumable resource may be represented electronically in an AR or VR environment. In order to replenish the resource, the user manipulates a physical object in the real world, which is then represented in a revised presentation in the AR or VR environment. As an example, a battery charge level may be represented as a weapon energy level in a game. As the battery charge depletes, the weapon's energy level correspondingly depletes. In order to recharge (e.g., reload) the weapon, the user physically replaces the battery in the real world. The battery may be formed in the shape of a gun magazine in order to further immerse the user in the experience. Multiple batteries may be used to power the AR or VR system in order to ensure continuous uptime. In a multiple-battery system, the user may replace a single battery at a time to increase in-game resources (e.g., ammo, vehicle fuel, magic capacity, weapon charge, etc.).

Figure 1:
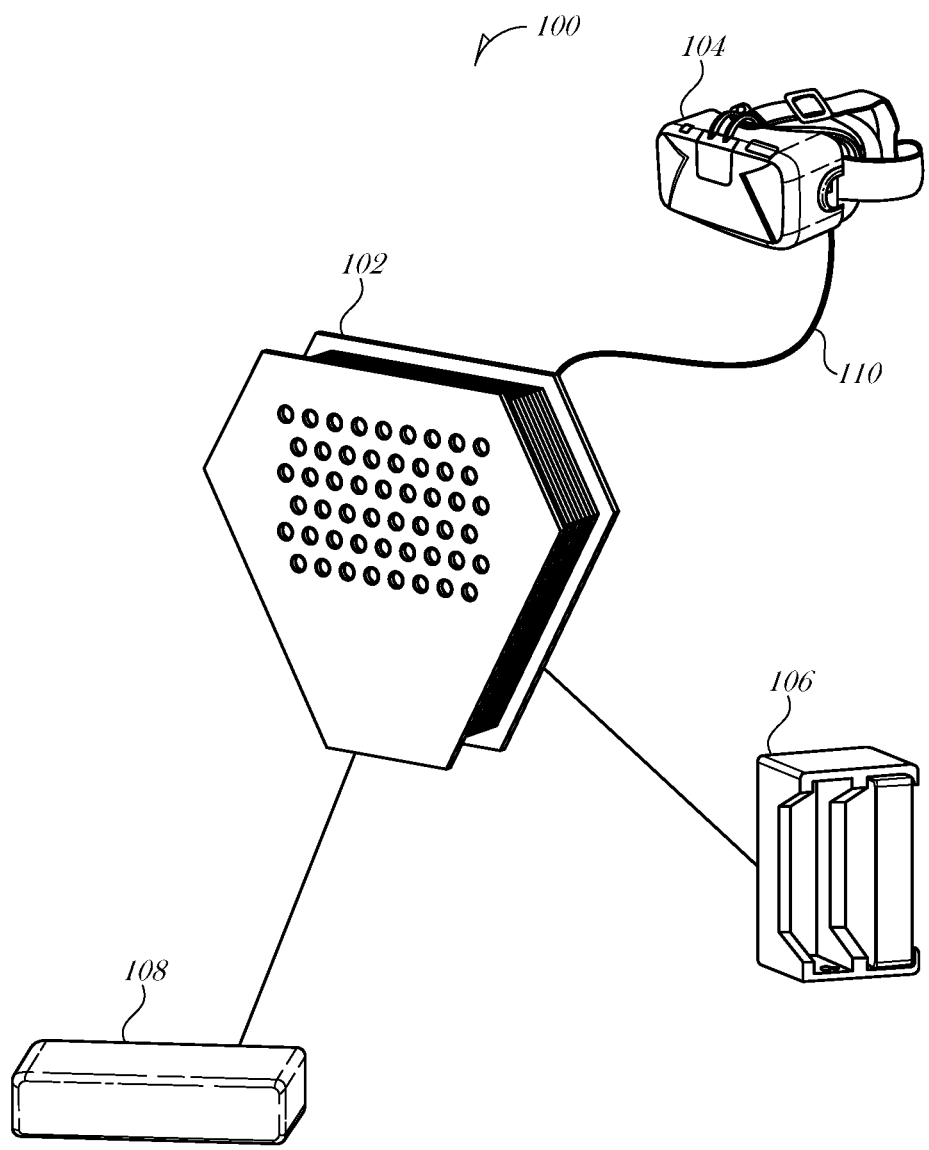
FIG. 1 is an HMD system for immersive experiences, according to an embodiment.

FIG. 1 is an HMD system 100 for immersive experiences, according to an embodiment. The system 100 includes a host computing unit 102, which is used to operate a head-mounted display (HMD) 104, and is powered by a battery assembly 106. The battery assembly 106 may include one or more batteries, any of which may be hot swappable by the user. The host computing unit 102 may include a main battery 108 that is incorporated into the host computing unit 102 and used as a reserve battery. For example, during operation, the batteries in the battery assembly 106 may be expended first, and then while they are being swapped out or when they are depleted, the main battery 108 may be used to power the host computing unit 102 and the HMD 104.

The host computing unit 102 and HMD 104 may be physically coupled, such as with a cable 110 to provide power, video signals, and audio signals to the HMD 104 from the computing unit 102, and control and data signals from the HMD 104 to the computing unit 102. Alternatively, the HMD 104 may be self-powered using one or more batteries or other power sources. When the HMD 104 is self-powered, a wireless connection may be used in place of a wired connection in order to provide a greater freedom of motion for the user.

The host computing unit 102 may take on various forms, such as a breastplate, a belt pack, or be incorporated into wearable devices such as clothing, helmets, backpacks, wrist-based devices, or the like. Because of the power and computational requirements to provide AR or VR experiences, conventional units may be relatively large and may be incorporated or worn in larger packages. As technology advances, the size of the host computing unit 102 may be miniaturized to a point where the host computing unit 104 may be incorporated into a wrist watch-type form factor.

The HMD 104 may come in a variety of form factors including goggles, visors, glasses, helmets with face shields, and the like. As technology improves, HMDs are becoming more affordable for consumer devices and smaller and lighter to accommodate various applications.

Figure 2:
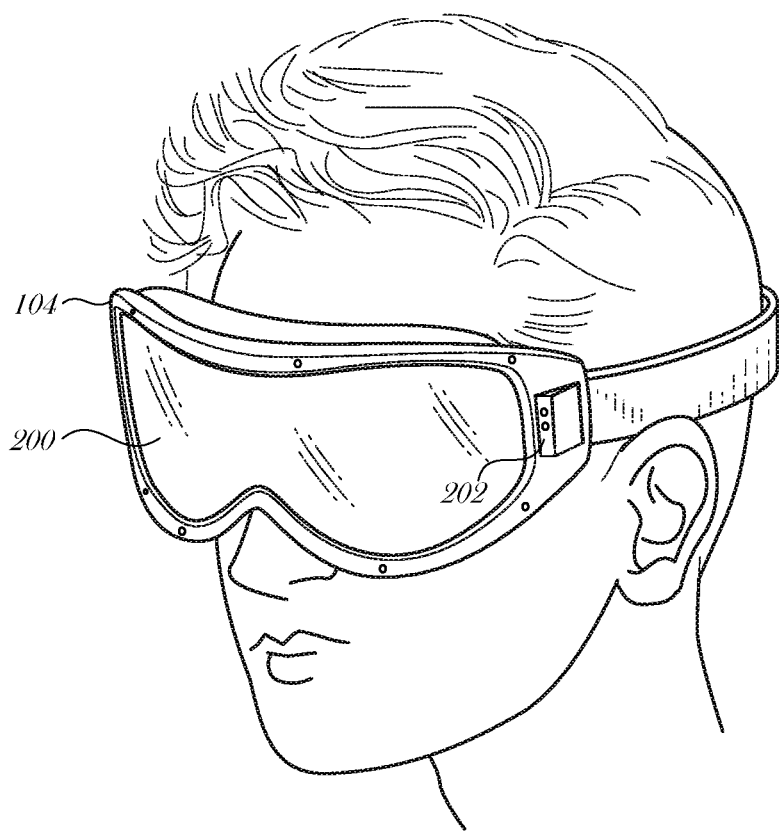
FIG. 2 is an HMD, according to an embodiment.

FIG. 2 is an HMD 104, according to an embodiment. The HMD 104 includes a display surface 200, a camera array 202, and processing circuitry (not shown). An image or multiple images may be projected onto the display surface 200, such as by a micro-display. Alternatively, some or all of the display surface 200 may be an active display (e.g., an organic light-emitting diode (OLED)) display able to produce an image in front of the user. The display also may be provided using retinal projection of various types of light, using a range of mechanisms, including (but not limited to) waveguides, scanning raster, color-separation and other mechanisms.

The camera array 202 may include one or more cameras able to capture visible light, infrared, or the like, and may be used as 2D or 3D cameras (e.g., depth camera). The camera array 104 may be configured to detect a gesture made by the user (wearer).

An inward-facing camera array (not shown) may be used to track eye movement and determine directionality of eye gaze. Gaze detection may be performed using a non-contact, optical method to determine eye motion. Infrared light may be reflected from the user's eye and sensed by an inward-facing video camera or some other optical sensor. The information is then analyzed to extract eye rotation based on the changes in the reflections from the user's retina. Another implementation may use video to track eye movement by analyzing a corneal reflection (e.g., the first Purkinje image) and the center of the pupil. Use of multiple Purkinje reflections may be used as a more sensitive eye tracking method. Other tracking methods may also be used, such as tracking retinal blood vessels, infrared tracking, or near-infrared tracking techniques. A user may calibrate the user's eye positions before actual use.

Figure 3:
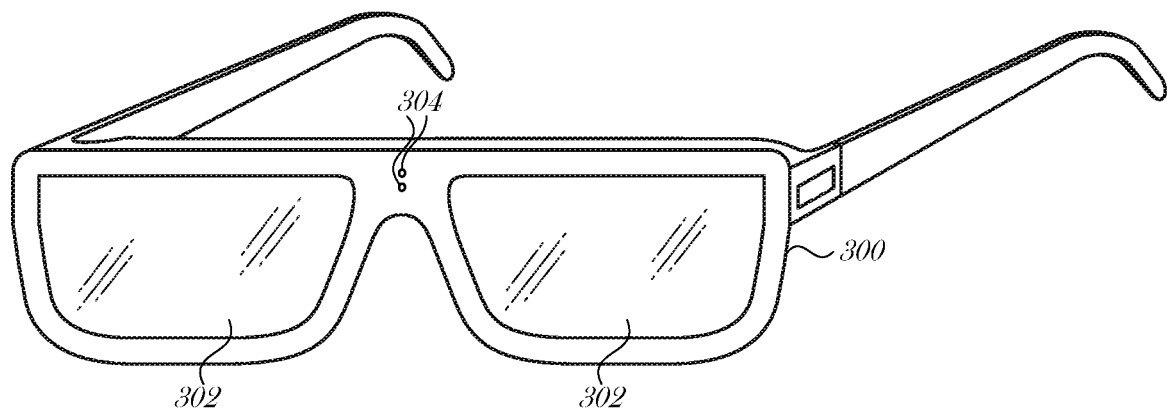
FIG. 3 is another HMD, according to embodiment.

FIG. 3 is another HMD 300, according to embodiment. The HMD 300 in FIG. 3 is in the form of eyeglasses. Similar to the HMD 104 of FIG. 2, HMD 300 includes two display surfaces 302 and a camera array 304. Processing circuitry and inward facing cameras (not shown) may perform the functions described above.

Figure 4:
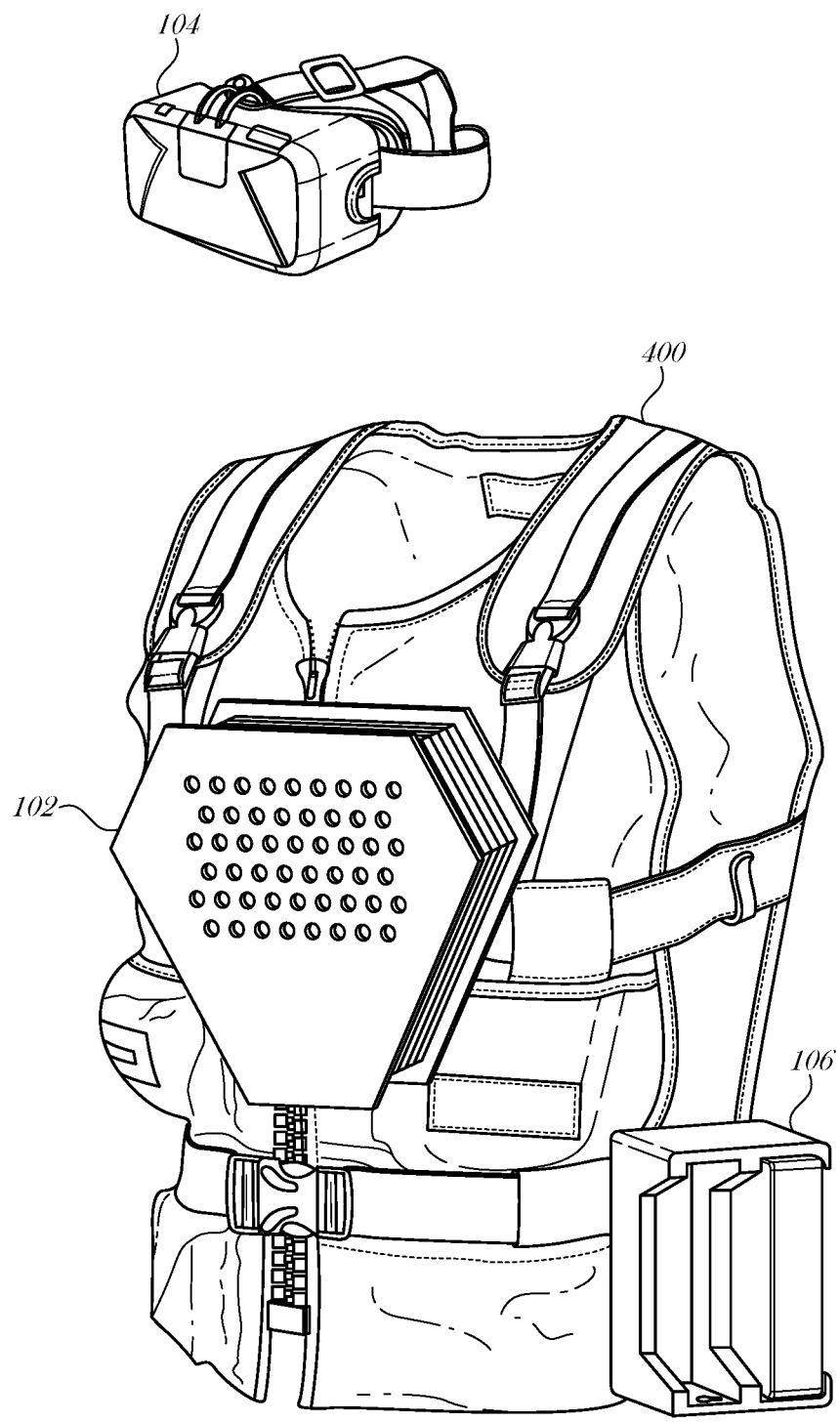
FIG. 4 is an illustration of a system that incorporates a host computing unit and a battery assembly, according to an embodiment.

FIG. 4 is an illustration of a system that incorporates a host computing unit 102 and a battery assembly 106, according to an embodiment. The host computing unit 102 may be attached to support apparel, which may be a vest, suspenders, belt, coat, pants, cloak, or the like. In the example illustrated in FIG. 4, the support apparel is a vest 400. The battery assembly 106 may also be attached or supported by the same support apparel that the computing unit 102 is attached to or supported by, or may be attached to or supported by a different apparel member. For example, the battery assembly 106 may be supported by a holster worn around the user's waist or leg, and the computing unit 102 may be supported by a backpack-like apparel worn on the user's back and suspended over the user's shoulders. Various other form factors may be used without departing from the scope of the present disclosure.

In use, the computing unit 102 and battery assembly 106 are coupled by a power line cord, where the battery assembly 106 is used to provide at least a portion of the power needed to operate the computing unit 102. Other sources of power may be available for the computing unit 102, such as an integrated battery inside the housing of the computing unit 102, or a second battery assembly separate from the battery assembly 106. As another example, batteries may be stored in a weapon-shaped controller such that replacing the battery simulates reloading the weapon. Batteries may have a form similar to a 9 mm magazine. In this example, when the user replaces a battery, it is similar in action and function as replacing a magazine to reload a weapon. Thus, as the user is experiencing the AR or VR experience provided by the host computing unit 102 via the HMD 102, the user may swap out one or more batteries from the battery assembly 106 (or a secondary battery assembly, etc.) in a manner consistent within the AR or VR experience.

Figure 5:
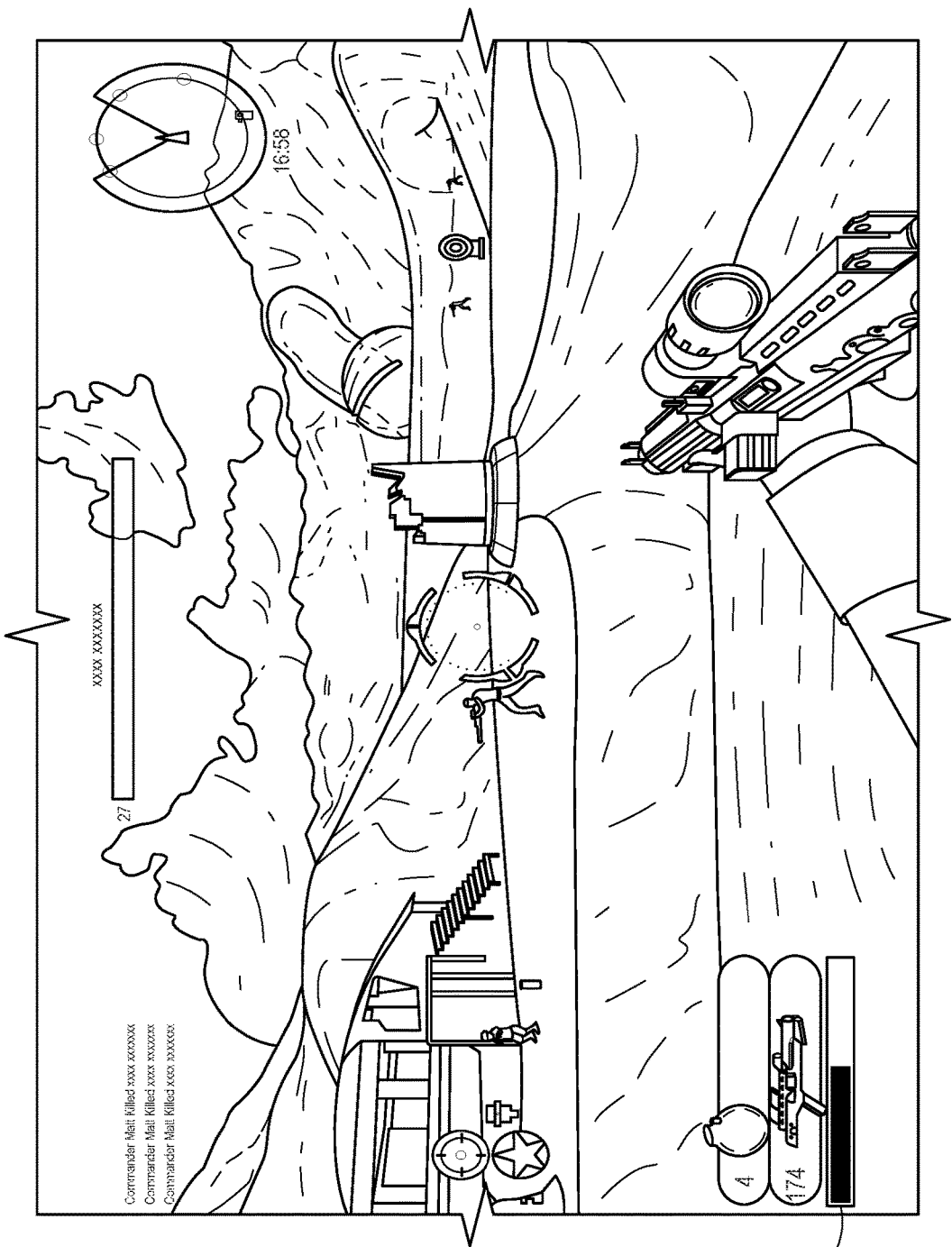
FIG. 5 is an example user interface of a VR experience, according to an embodiment.

FIG. 5 is an example user interface 500 of a VR experience, according to an embodiment. In the user interface 500 illustrated, a resource meter 502 is displayed. The resource meter 502 may be independent from the number of rounds used to fire the weapon 504, and instead be tied to the amount of battery charge left in the batteries currently situated in the battery assembly 106. As the battery charge depletes, the resource meter 502 is updated to reflect the current battery charge. The user monitors the weapon's rounds, the player's health, and other statistics or metrics of gameplay along with the battery charge indicated by the resource meter 502. If the resource meter 502 completely depletes, the user may lose a life, for example, in gameplay. As such, the user is incentivized to monitor the resource meter 502 and when appropriate, change out one or more batteries in the battery assembly 106. Based on the example illustrated in FIG. 4, the user may store backup batteries in one or more pouches on the vest. In this manner, as the user is experiencing the virtual reality interaction of the game world, the user is also manipulating real-world objects, thereby further enhancing the immersion in the VR experience.

While battery charge is used in these examples, other resources may be represented in the AR or VR experience, such that the user is prompted or understands the need to replenish, change out, or otherwise perform actions on real-world objects in order to further gameplay. For example, a user may swap out a USB drive as log data fills it to capacity. As another example, a user may swap out a processing core when the working processing core's temperature reaches thermal thresholds.

Figure 6:
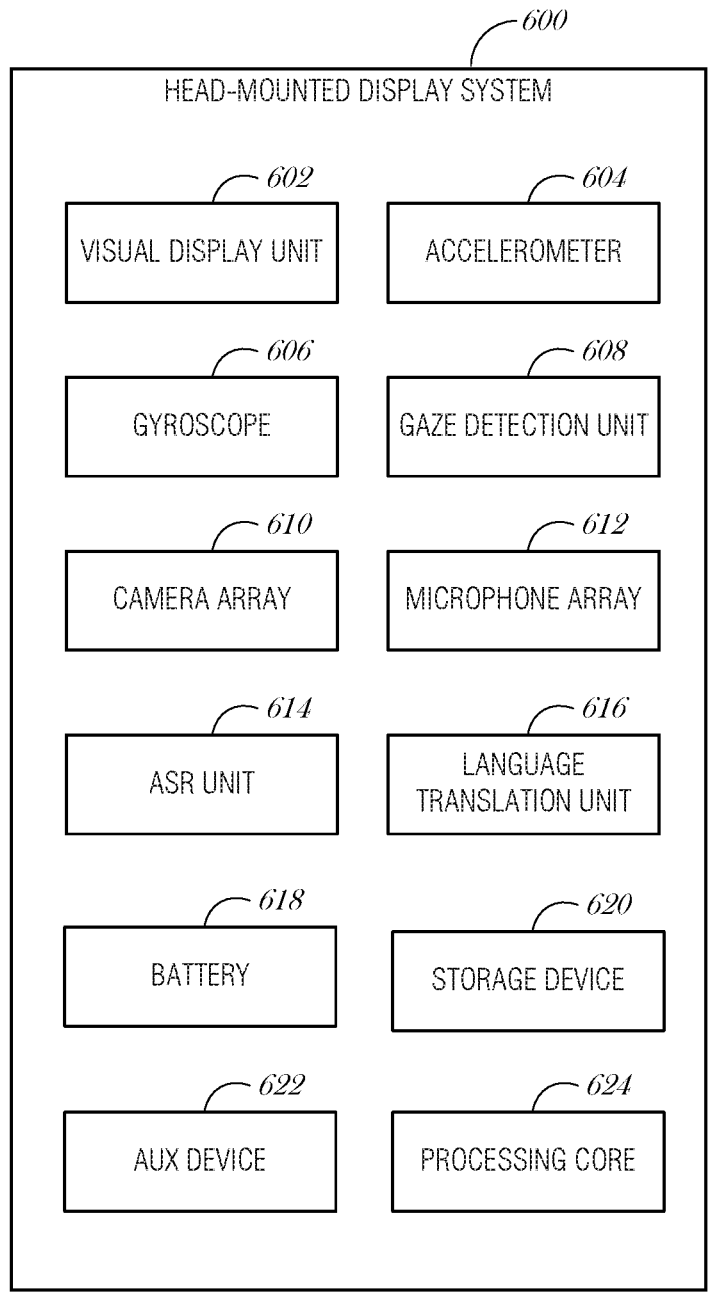
FIG. 6 is a schematic drawing illustrating a head-mounted display system, according to an embodiment.

FIG. 6 is a schematic drawing illustrating a head-mounted display system 600, according to an embodiment. The HMD system 600 includes a visual display unit 602, an accelerometer 604, a gyroscope 606, a gaze detection unit 608, a world-facing camera array 610, and a microphone array 612.

The visual display unit 602 is operable to present a displayed image to the wearer (e.g., user) of the HMD system 600. For AR, the visual display unit 602 may operate in any manner including projecting images onto a translucent surface between the user's eye(s) and the outer world, the translucent surface may implement mirrors, lenses, prisms, color filters, or other optical apparatus to generate an image. The visual display unit 602 may operate by projecting images directly onto the user's retinas. In general, the visual display unit 602 may operate to provide an augmented reality (AR) experience where the user is able to view most of the real world around her with the computer generated image (CGI) (e.g., AR content) being a relatively small portion of the user's field of view. The mixture of the virtual reality images and the real-world experience provides an immersive, mobile, and flexible experience. For VR, the visual display unit 602 may project imagery onto an opaque surface or surfaces, presenting a completely artificial environment to the user.

The HMD system 600 includes an inertial tracking system that employs a sensitive inertial measurement unit (IMU). The IMU may include the accelerometer 604 and the gyroscope 606, and optionally includes a magnetometer. The IMU is an electronic device that measures a specific force, angular rate, and sometimes magnetic field around the HMD system 600. The IMU may calculate six degrees of freedom allowing the HMD system 600 to align AR content to the physical world or to generally determine the position or movement of the user's head.

The gaze detection unit 608 may employ an eye tracker to measure the point of gaze, allowing the HMD system 600 to determine where the user is looking. Gaze detection may be performed using a non-contact, optical method to determine eye motion. Infrared light may be reflected from the user's eye and sensed by an inward-facing video camera or some other optical sensor. The information is then analyzed to extract eye rotation based on the changes in the reflections from the user's retina. Another implementation may use video to track eye movement by analyzing a corneal reflection (e.g., the first Purkinje image) and the center of the pupil. Use of multiple Purkinje reflections may be used as a more sensitive eye tracking method. Other tracking methods may also be used, such as tracking retinal blood vessels, infrared tracking, or near-infrared tracking techniques. The gaze detection unit 608 may calibrate the user's eye positions before actual use.

The world-facing camera array 610 may include one or more infrared or visible light cameras, able to focus at long-range or short-range with narrow or large fields of view. The world-facing camera array 610 may be used to capture user gestures for gesture control input, environmental landmarks, people's faces, or other information to be used by the HMD system 600.

In operation, while the user is wearing the HMD system 600, the user may be interacting with several people, each of whom are talking. When the user looks at one of the talking people, the microphone array 612 is configured to capture audible data emanating from the direction corresponding with the user's gaze. An automatic speech recognition (ASR) unit 614 may be configured to identify speech from the audible data. The ASR unit 604 may interface with a language translation unit 616, which may be used in some cases to translate the received sound data from a first language to a second language.

The microphone array 612 may include two or more microphones. For example, to cover the span of a user's forward gaze (e.g., roughly 180 degrees), eighteen microphones may be used in the microphone array 612, with each microphone covering approximately ten degrees of arc.

Portions of the HMD system 600 may be physically embodied in separate apparatus or devices. For example, the visual display unit 602 may include one or more specialized processor (e.g., graphics processing units (GPUs)). Alternatively, the GPUs may be housed in a separate apparatus (e.g., host computing unit 102) that provides video signals to the visual display unit 602.

The HMD system 600 may also optionally include one or more batteries 618, one or more storage devices 620, or other auxiliary devices 622. The HMD system 600 may also optionally include swappable processing cores 624, such as swappable GPUs. A processing core 624 may include circuitry to down step processing power when thermal thresholds are exceeded. This is commonly referred to as thermal throttling. For example, some processors include circuitry to prevent overheating during heavy use by stepping down the operating clock speed of the processor. By reducing clock speed, the operating voltage may also be reduced, thereby reducing heat output. However, the reduction in clock speed also reduces the processor's performance. As such, in an example, the user is able to hot swap a GPU or other co-processor in order to maintain or increase the processing power available for video rendering. In such an example, the temperature of the swappable processor may be represented in the virtual experience and integrated into gameplay or other aspects of the virtual environment.

Similarly, a storage device 620 may be hot-swappable. For example, a USB storage device may be connected to the HMD system 600. During the immersive experience (e.g., AR or VR event), the storage device 620 may be written to and begin to fill up. For example, log files, photos, video, or other data may be written to the storage device 620. As the storage device 620 fills a representation of the remaining storage capacity is presented to the user. When the storage capacity is exhausted, the user may experience some effect in the AR or VR experience. For example, when the storage capacity is full, the user may not be able to drive their virtual vehicle until a new storage device is inserted into a USB port. As such, to continue using in-game or in-experience resources (e.g., a vehicle, weapon, or the like), the user has to interact with the real-world storage device 620 and swap in a new USB drive. The storage device 620 may take any form, including but not limited to a USB drive, a secure digital (SD) card, a mini SD card, a micro SD card, a CompactFlash (CF) card, a Memory Stick card, or the like.

Figure 7:
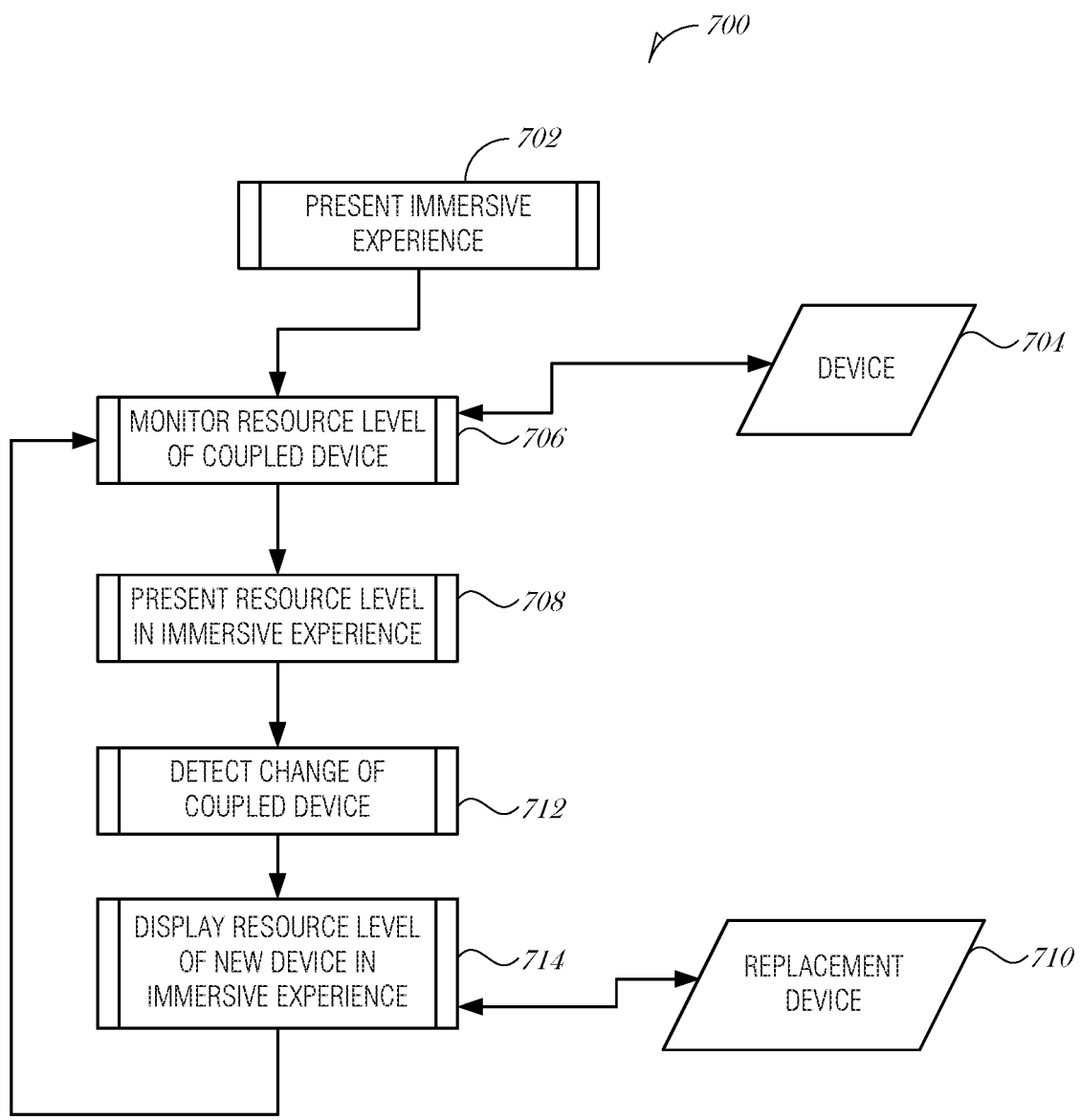
FIG. 7 is a flowchart illustrating control and data flow, according to an embodiment.

FIG. 7 is a flowchart illustrating control and data flow 700, according to an embodiment. An immersive experience is presented (operation 702) to a user. The immersive experience may be a gaming environment, for example, or other virtual or augmented reality experience. The experience may be presented using an HMD. During the experience, a resource level of a device (704) coupled to the HMD is monitored (operation 706) and presented to the user (operation 708).

In one case the device 704 is a battery and the resource level is a remaining or current charge of the battery. The battery charge level may be presented in the immersive experience, for example, using a bar meter, numerical indication, or the like. To monitor the battery charge level, one of a variety of methods may be used. Battery state-of-charge is the percentage of charge remaining in a battery, and ranges from 0% to 100%. A coulomb counter or battery gas gauge may be used to determine the battery state-of-charge. For example, using a current-based method, the coulomb counter tracks the change in charge remaining in the battery by measuring discharge and charge currents. Using a voltage-based method to determine state-of-charge measures battery voltage and relates that value to charge level. In this case, the system measures voltage of the battery either connected to an external load or in open circuit. Other methods, such as model-based methods, may be used.

In another case the device 704 is a storage device and the resource level is a representation of the remaining storage capacity or current storage usage of the storage device. Storage usage, capacity, and remaining capacity may be provided by referencing a file system table or other use table.

In another case the device 704 is a processor, subprocessor, co-processor, graphical processing unit, or the like. In this case, the resource level may indicate an operating clock speed of the processor, an operating temperature, an operating voltage, or other aspects of the processing device.

Based on game play or other in-experience events, the user may be incentivized, asked, or prompted to change out the device 704 with a different replacement device 710. The replacement device 710 may be of the same type as the device 704, for example, a same or similar battery. Alternatively, the replacement device 710 may be compatible with the device 704, but not specifically the same. For example, the replacement device 710 may be a 2 GB USB flash drive and the initial device 704 may be a USB hard disk drive (HDD).

Referring to FIG. 5, which is a first-person shooting game, once the battery energy is depleted (as indicated by the resource meter 502), the user may not be able to fire the weapon until a replacement battery is inserted into the battery assembly 106 to raise the resource level over a threshold.

Returning to FIG. 7, at operation 712, the control and data flow 700 detects that there was a change to the coupled device. The replacement device's resource level is displayed in the immersive experience (operation 714). When there is a gameplay or other functionality linked to the resource level, then the gameplay or experience may be altered based on the new resource level of the replacement device 710. As an example, the user's weapon may be functional and able to shoot after replacing the battery.

Figure 8:
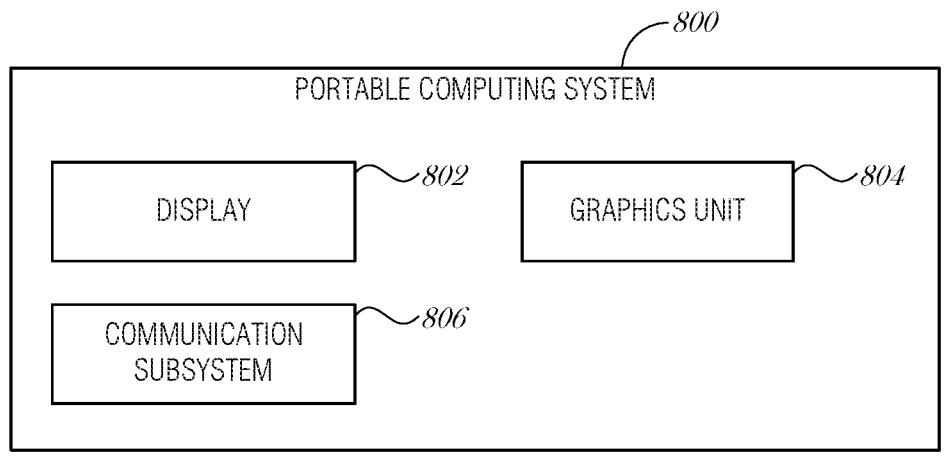
FIG. 8 is a block diagram illustrating a system, according to an embodiment.

FIG. 8 is a block diagram illustrating a system 800, according to an embodiment. The system 800 may include a display 802, a graphics unit 804, and a communication subsystem 806. The display 802 may be any type of display device, including display surface 200. In an embodiment, the portable computing system comprises a head-mounted display system.

In an embodiment, the graphics unit 804 is configured to present the immersive experience to a user on the display. In an embodiment, the immersive experience comprises a game.

The communication subsystem 806 is configured to determine a resource level of a resource coupled to the portable computing system. The graphics unit is to present a representation of the resource level to the user in the immersive experience. This may be performed by presenting a bar meter, numerical indication, or the like.

In an embodiment, the resource coupled to the portable computing system comprises a battery, and the resource level comprises a remaining battery charge. In another embodiment, the resource coupled to the portable computing system comprises a processing unit, and the resource level comprises an operating temperature of the processing unit. In another embodiment, the resource coupled to the portable computing system comprises a storage device, and the resource level comprises a remaining storage space on the storage device.

In an embodiment, to determine the resource level of the resource coupled to the portable computing system, the communication subsystem 806 is to query the resource for the resource level and receive a response from the resource including the resource level.

The communication subsystem 806 is to detect that the resource was replaced with a replacement resource, the replacement caused by a real-world interaction with the resource by the user (e.g., swapping batteries), and determine a replacement resource level of the replacement resource (e.g., a replacement battery charge).

In an embodiment, to detect that the resource was replaced with the replacement resource, the communication subsystem 806 is to detect a circuit discontinuity followed by a circuit re-establishment, the circuit including the resource.

In an embodiment, to detect that the resource was replaced with the replacement resource, the communication subsystem 806 is to detect a first state change indicating that the resource has been disconnected followed by detecting a second state change indicating that the replacement resource has been connected to the portable computing system.

The graphics unit 804 is then to present a representation of the replacement resource level in the immersive experience on the display.

In an embodiment, to present the representation of the resource level to the user in the immersive experience, the graphics unit 804 is to present a graphical meter representing the resource level on the display 802.

In an embodiment, the immersive experience includes a gaming experience, and to determine the resource level of the resource, the communication subsystem 806 is to determine that the resource level of the resource violates a threshold, and in response, the gaming experience is altered when the resource violates the threshold. In a further embodiment, the communication subsystem 806 is to determine that the replacement resource level of the replacement resource satisfies the threshold, and in response, the gaming experience is altered when the replacement resource level satisfies the threshold. For example, the gaming experience may be returned to a previous state before the threshold was violated. The threshold may be a certain amount of remaining battery life (e.g., 5%, 10%, etc.), an operating temperature of a processor (e.g., 100 degrees Celsius), a remaining storage amount (e.g., 5% remaining storage space, 500 MB remaining storage space, etc.), or any other aspect of a depletable or dynamic resource.

In a further embodiment, the graphics unit 804 is to alert the user that the resource violates the threshold. For example, the user may be presented with a flashing resource meter, a message in their field of vision, or the like. The notification may also include haptic feedback, audio, or combinations of video, audio, haptic, and other notification mechanisms.

Figure 9:
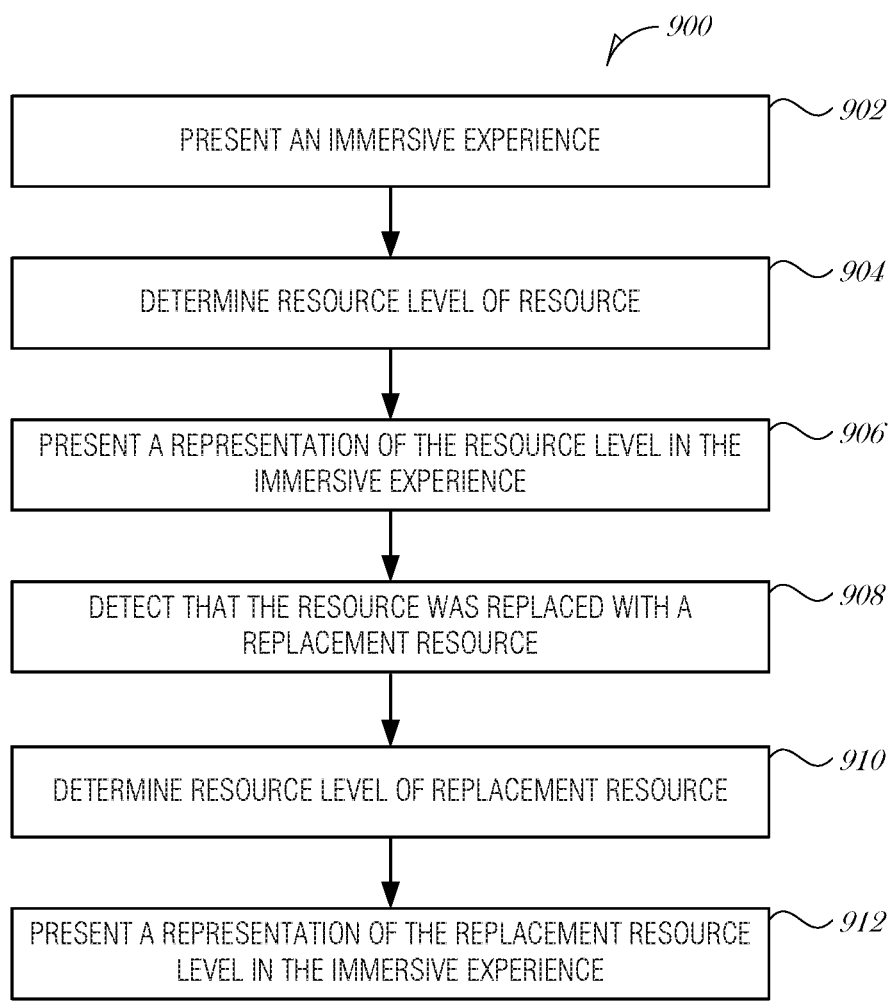
FIG. 9 is a flowchart illustrating a method for providing an immersive experience, according to an embodiment.

FIG. 9 is a flowchart illustrating a method 900 for providing an immersive experience, according to an embodiment. At block 902, the immersive experience is presented to a user via a portable computing system. In an embodiment, the immersive experience comprises a game. In an embodiment, the portable computing system comprises a head-mounted display system.

At block 904, a resource level of a resource coupled to the portable computing system is determined. In an embodiment, determining the resource level of the resource coupled to the portable computing system comprises querying the resource for the resource level and receiving a response from the resource including the resource level. For example, a storage device may have a memory controller that maintains the amount of storage used or free. The portable computing system may query the storage device as part of a mounting process.

At block 906, a representation of the resource level is presented to the user in the immersive experience. In an embodiment, presenting the representation of the resource level to the user in the immersive experience comprises presenting a graphical meter representing the resource level.

At block 908, it is detected that the resource was replaced with a replacement resource, the replacement caused by a real-world interaction with the resource by the user. For example, the user may physically remove one battery from the battery assembly and replace it with a battery with more charge.

In an embodiment, detecting that the resource was replaced with the replacement resource comprises detecting a circuit discontinuity followed by a circuit re-establishment, the circuit including the resource. For example, the presence of a battery may be determined using a low voltage or low current circuit, which when completed indicates that a battery is inserted into the battery assembly.

In an embodiment, detecting that the resource was replaced with the replacement resource comprises detecting a first state change indicating that the resource has been disconnected followed by detecting a second state change indicating that the replacement resource has been connected to the portable computing system. The state change may be a file system dismount followed by a file system mount, a battery circuit discontinuity, or the like.

At block 910, a replacement resource level of the replacement resource is determined. This may be performed similarly to operation 904. At block 912, a representation of the replacement resource level is presented in the immersive experience. This may be performed similarly to operation 906.

In an embodiment, the resource coupled to the portable computing system comprises a battery, and the resource level comprises a remaining battery charge. In another embodiment, the resource coupled to the portable computing system comprises a processing unit, and the resource level comprises an operating temperature of the processing unit. In another embodiment, the resource coupled to the portable computing system comprises a storage device, and the resource level comprises a remaining storage space on the storage device.

In an embodiment, the immersive experience includes a gaming experience, and wherein determining the resource level of the resource comprises determining that the resource level of the resource is violates a threshold, and wherein the method further comprises altering the gaming experience when the resource violates the threshold. For example the user may not be able to perform some actions in the game until the real-world resource is replenished.

In an embodiment, the method 900 includes alerting the user that the resource is below the threshold. For example, when the battery is below a certain charge level, the game may notify the user by blinking the resource meter, providing an in-game sound, providing a voice alert (e.g., "You're running low on power") or the like. The notification may be a combination of different sensations, such as visual, sound, and haptics. For example, the haptic sensation and sound from firing a gun in the game may diminish in strength/loudness as the resource is being depleted.

In a further embodiment, the method 900 includes determining that the replacement resource level of the replacement resource satisfies the threshold and altering the gaming experience when the replacement resource level satisfies the threshold. As an example, the user may be notified that there is less than 5% battery charge remaining (the threshold being 5%) and when the battery is replaced, the battery charge is 92%, which satisfies the threshold value.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 10:
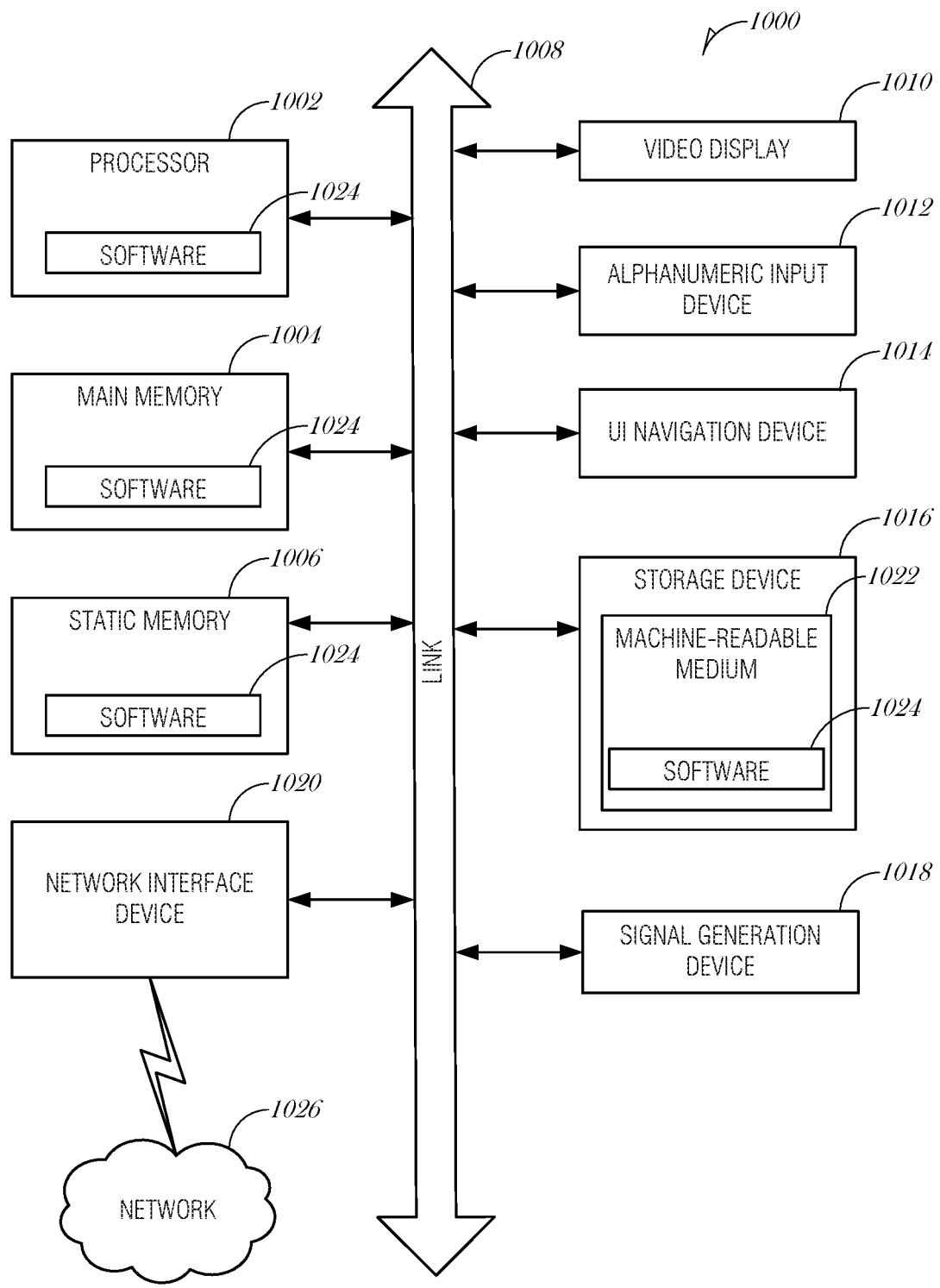
FIG. 10 is a block diagram illustrating an example machine upon which any one or more of the techniques (e.g., methodologies) discussed herein may perform, according to an example embodiment.

FIG. 10 is a block diagram illustrating a machine in the example form of a computer system 1000, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1000 includes at least one processor 1002 (e.g., a central processing unit (CPU), a graphics processing unit (GPU) or both, processor cores, compute nodes, etc.), a main memory 1004 and a static memory 1006, which communicate with each other via a link 1008 (e.g., bus). The computer system 1000 may further include a video display unit 1010, an alphanumeric input device 1012 (e.g., a keyboard), and a user interface (UI) navigation device 1014 (e.g., a mouse). In one embodiment, the video display unit 1010, input device 1012 and UI navigation device 1014 are incorporated into a touch screen display. The computer system 1000 may additionally include a storage device 1016 (e.g., a drive unit), a signal generation device 1018 (e.g., a speaker), a network interface device 1020, and one or more sensors (not shown), such as a global positioning system (GPS) sensor, compass, accelerometer, gyrometer, magnetometer, or other sensor.

The storage device 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004, static memory 1006, and/or within the processor 1002 during execution thereof by the computer system 1000, with the main memory 1004, static memory 1006, and the processor 1002 also constituting machine-readable media.

While the machine-readable medium 1022 is illustrated in an example embodiment to be a single medium, the term "machine-readable medium" may include a single medium or multiple media (e.g., a centralized or distributed database, and/or associated caches and servers) that store the one or more instructions 1024. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 includes subject matter for providing an immersive experience (such as a device, apparatus, or machine) comprising: a display; a graphics unit to present the immersive experience to a user on the display; and a communication subsystem to determine a resource level of a resource coupled to the portable computing system; wherein the graphics unit is to present a representation of the resource level to the user in the immersive experience; wherein the communication subsystem is to: detect that the resource was replaced with a replacement resource, the replacement caused by a real-world interaction with the resource by the user; and determine a replacement resource level of the replacement resource; and wherein the graphics unit is to present a representation of the replacement resource level in the immersive experience on the display.

In Example 2, the subject matter of Example 1 may include, wherein the immersive experience comprises a game.

In Example 3, the subject matter of any one of Examples 1 to 2 may include, wherein the resource coupled to the portable computing system comprises a battery, and wherein the resource level comprises a remaining battery charge.

In Example 4, the subject matter of any one of Examples 1 to 3 may include, wherein the resource coupled to the portable computing system comprises a processing unit, and wherein the resource level comprises an operating temperature of the processing unit.

In Example 5, the subject matter of any one of Examples 1 to 4 may include, wherein the resource coupled to the portable computing system comprises a storage device, and wherein the resource level comprises a remaining storage space on the storage device.

In Example 6, the subject matter of any one of Examples 1 to 5 may include, wherein to determine the resource level of the resource coupled to the portable computing system, the communication subsystem is to: query the resource for the resource level; and receive a response from the resource including the resource level.

In Example 7, the subject matter of any one of Examples 1 to 6 may include, wherein to present the representation of the resource level to the user in the immersive experience, the graphics unit is to present a graphical meter representing the resource level on the display.

In Example 8, the subject matter of any one of Examples 1 to 7 may include, wherein to detect that the resource was replaced with the replacement resource, the communication subsystem is to detect a circuit discontinuity followed by a circuit re-establishment, the circuit the resource.

In Example 9, the subject matter of any one of Examples 1 to 8 may include, wherein to detect that the resource was replaced with the replacement resource, the communication subsystem is to detect a first state change indicating that the resource has been disconnected followed by detecting a second state change indicating that the replacement resource has been connected to the portable computing system.

In Example 10, the subject matter of any one of Examples 1 to 9 may include, wherein the portable computing system comprises a head-mounted display system.

In Example 11, the subject matter of any one of Examples 1 to 10 may include, wherein the immersive experience includes a gaming experience, and wherein to determine the resource level of the resource, the communication subsystem is to determine that the resource level of the resource violates a threshold, and wherein the gaming experience is altered when the resource violates the threshold.

In Example 12, the subject matter of any one of Examples 1 to 11 may include, wherein the communication subsystem is to determine that the replacement resource level of the replacement resource satisfies the threshold; and wherein the gaming experience is altered when the replacement resource level satisfies the threshold.

In Example 13, the subject matter of any one of Examples 1 to 12 may include, wherein the graphics unit is to alert the user that the resource violates the threshold.

Example 14 includes subject matter for providing an immersive experience (such as a method, means for performing acts, machine readable medium including instructions that when performed by a machine cause the machine to performs acts, or an apparatus to perform) comprising: presenting, in a portable computing system, the immersive experience to a user; determining a resource level of a resource coupled to the portable computing system; presenting a representation of the resource level to the user in the immersive experience; detecting that the resource was replaced with a replacement resource, the replacement caused by a real-world interaction with the resource by the user; determining a replacement resource level of the replacement resource; and presenting a representation of the replacement resource level in the immersive experience.

In Example 15, the subject matter of Example 14 may include, wherein the immersive experience comprises a game.

In Example 16, the subject matter of any one of Examples 14 to 15 may include, wherein the resource coupled to the portable computing system comprises a battery, and wherein the resource level comprises a remaining battery charge.

In Example 17, the subject matter of any one of Examples 14 to 16 may include, wherein the resource coupled to the portable computing system comprises a processing unit, and wherein the resource level comprises an operating temperature of the processing unit.

In Example 18, the subject matter of any one of Examples 14 to 17 may include, wherein the resource coupled to the portable computing system comprises a storage device, and wherein the resource level comprises a remaining storage space on the storage device.

In Example 19, the subject matter of any one of Examples 14 to 18 may include, wherein determining the resource level of the resource coupled to the portable computing system comprises: querying the resource for the resource level; and receiving a response from the resource including the resource level.

In Example 20, the subject matter of any one of Examples 14 to 19 may include, wherein presenting the representation of the resource level to the user in the immersive experience comprises presenting a graphical meter representing the resource level.

In Example 21, the subject matter of any one of Examples 14 to 20 may include, wherein detecting that the resource was replaced with the replacement resource comprises detecting a circuit discontinuity followed by a circuit re-establishment, the circuit the resource.

In Example 22, the subject matter of any one of Examples 14 to 21 may include, wherein detecting that the resource was replaced with the replacement resource comprises detecting a first state change indicating that the resource has been disconnected followed by detecting a second state change indicating that the replacement resource has been connected to the portable computing system.

In Example 23, the subject matter of any one of Examples 14 to 22 may include, wherein the portable computing system comprises a head-mounted display system.

In Example 24, the subject matter of any one of Examples 14 to 23 may include, wherein the immersive experience includes a gaming experience, and wherein determining the resource level of the resource comprises determining that the resource level of the resource violates a threshold, and wherein the method further comprises altering the gaming experience when the resource violates the threshold.

In Example 25, the subject matter of any one of Examples 14 to 24 may include, determining that the replacement resource level of the replacement resource satisfies the threshold; and altering the gaming experience when the replacement resource level satisfies the threshold.

In Example 26, the subject matter of any one of Examples 14 to 25 may include, alerting the user that the resource violates the threshold.

Example 27 includes at least one machine-readable medium including instructions, which when executed by a machine, cause the machine to perform operations of any of the Examples 14-26.

Example 28 includes an apparatus comprising means for performing any of the Examples 14-26.

Example 29 includes subject matter for providing an immersive experience (such as a device, apparatus, or machine) comprising: means for presenting, in a portable computing system, the immersive experience to a user; means for determining a resource level of a resource coupled to the portable computing system; means for presenting a representation of the resource level to the user in the immersive experience; means for detecting that the resource was replaced with a replacement resource, the replacement caused by a real-world interaction with the resource by the user; means for determining a replacement resource level of the replacement resource; and means for presenting a representation of the replacement resource level in the immersive experience.

In Example 30, the subject matter of Example 29 may include, wherein the immersive experience comprises a game.

In Example 31, the subject matter of any one of Examples 29 to 30 may include, wherein the resource coupled to the portable computing system comprises a battery, and wherein the resource level comprises a remaining battery charge.

In Example 32, the subject matter of any one of Examples 29 to 31 may include, wherein the resource coupled to the portable computing system comprises a processing unit, and wherein the resource level comprises an operating temperature of the processing unit.

In Example 33, the subject matter of any one of Examples 29 to 32 may include, wherein the resource coupled to the portable computing system comprises a storage device, and wherein the resource level comprises a remaining storage space on the storage device.

In Example 34, the subject matter of any one of Examples 29 to 33 may include, wherein the means for determining the resource level of the resource coupled to the portable computing system comprise: means for querying the resource for the resource level; and means for receiving a response from the resource including the resource level.

In Example 35, the subject matter of any one of Examples 29 to 34 may include, wherein the means for presenting the representation of the resource level to the user in the immersive experience comprise means for presenting a graphical meter representing the resource level.

In Example 36, the subject matter of any one of Examples 29 to 35 may include, wherein the means for detecting that the resource was replaced with the replacement resource comprise means for detecting a circuit discontinuity followed by a circuit re-establishment, the circuit the resource.

In Example 37, the subject matter of any one of Examples 29 to 36 may include, wherein the means for detecting that the resource was replaced with the replacement resource comprise means for detecting a first state change indicating that the resource has been disconnected followed by detecting a second state change indicating that the replacement resource has been connected to the portable computing system.

In Example 38, the subject matter of any one of Examples 29 to 37 may include, wherein the portable computing system comprises a head-mounted display system.

In Example 39, the subject matter of any one of Examples 29 to 38 may include, wherein the immersive experience includes a gaming experience, and wherein the means for determining the resource level of the resource comprise means for determining that the resource level of the resource violates a threshold, and wherein the apparatus further comprises means for altering the gaming experience when the resource violates the threshold.

In Example 40, the subject matter of any one of Examples 29 to 39 may include, means for determining that the replacement resource level of the replacement resource satisfies the threshold; and means for altering the gaming experience when the replacement resource level satisfies the threshold.

In Example 41, the subject matter of any one of Examples 29 to 40 may include, means for alerting the user that the resource violates the threshold.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A portable computing system for providing an immersive gaming experience, the portable computing system comprising:
    a display;
    a graphics processing unit to present the immersive gaming experience to a user on the display; and
        a communication subsystem to determine a resource level of a resource coupled to the portable computing system;
        wherein the graphics processing unit is to present a representation of the resource level to the user in the immersive gaming experience, the representation of the resource level tied to an in-game mechanism, wherein an operation or state of the in-game mechanism is altered based on the resource level;
        wherein the communication subsystem is to:
            detect that the resource was replaced with a replacement resource, the replacement caused by a real-world interaction with the resource by the user; and
            determine a replacement resource level of the replacement resource; and
        wherein the graphics processing unit is to present a representation of the replacement resource level in the immersive gaming experience on the display.

2. The system of claim 1, wherein the resource coupled to the portable computing system comprises a central processing unit, and wherein the resource level comprises an operating temperature of the central processing unit.

3. The system of claim 1, wherein to determine the resource level of the resource coupled to the portable computing system, the communication subsystem is to:
    query the resource for the resource level; and receive a response from the resource including the resource level.

4. The system of claim 1, wherein to present the representation of the resource level to the user in the immersive gaming experience, the graphics processing unit is to present a graphical meter representing the resource level on the display.

5. The system of claim 1, wherein to detect that the resource was replaced with the replacement resource, the communication subsystem is to detect a circuit discontinuity followed by a circuit re-establishment, the circuit including the resource.

6. The system of claim 1, wherein to detect that the resource was replaced with the replacement resource, the communication subsystem is to detect a first state change indicating that the resource has been disconnected followed by detecting a second state change indicating that the replacement resource has been connected to the portable computing system.

7. The system of claim 1, wherein the portable computing system comprises a head-mounted display system.

8. The system of claim 1, wherein the immersive experience includes a gaming experience, and wherein to determine the resource level of the resource, the communication subsystem is to determine that the resource level of the resource violates a threshold, and wherein the gaming experience is altered when the resource violates the threshold.

9. The system of claim 8, wherein the communication subsystem is to determine that the replacement resource level of the replacement resource satisfies the threshold; and
wherein the gaming experience is altered when the replacement resource level satisfies the threshold.

10. The system of claim 8, wherein the graphics processing unit is to alert the user that the resource violates the threshold.

11. The system of claim 1, wherein the in-game mechanism comprises ammunition available to a weapon used in the immersive gaming experience.

12. The system of claim 1, wherein the in-game mechanism comprises operation of a vehicle used in the immersive gaming experience.

13. A method for providing an immersive gaming experience, the method comprising:
presenting, in a portable computing system, the immersive gaming experience to a user;
determining a resource level of a resource coupled to the portable computing system;
presenting a representation of the resource level to the user in the immersive gaming experience, the representation of the resource level tied to an in-game mechanism, wherein an operation or state of the in-game mechanism is altered based on the resource level;
detecting that the resource was replaced with a replacement resource, the replacement caused by a real-world interaction with the resource by the user;
determining a replacement resource level of the replacement resource; and
presenting a representation of the replacement resource level in the immersive gaming experience.

14. The method of claim 13, wherein the resource coupled to the portable computing system comprises a central processing unit, and wherein the resource level comprises an operating temperature of the central processing unit.

15. The method of claim 13, wherein determining the resource level of the resource coupled to the portable computing system comprises:
querying the resource for the resource level; and
receiving a response from the resource including the resource level.

16. At least one non-transitory machine-readable medium including instructions for providing an immersive gaming experience, which when executed by a machine, cause the machine to:
present, in a portable computing system, the immersive gaming experience to a user;
determine a resource level of a resource coupled to the portable computing system;
present a representation of the resource level to the user in the immersive gaming experience, the representation of the resource level tied to an in-game mechanism, wherein an operation or state of the in-game mechanism is altered based on the resource level;
detect that the resource was replaced with a replacement resource, the replacement caused by a real-world interaction with the resource by the user;
determine a replacement resource level of the replacement resource; and
present a representation of the replacement resource level in the immersive gaming experience.

17. The at least one non-transitory machine-readable medium of claim 16, wherein the instructions to determine the resource level of the resource coupled to the portable computing system comprise instructions to:
query the resource for the resource level; and
receive a response from the resource including the resource level.

18. The at least one non-transitory machine-readable medium of claim 16, wherein the instructions to detect that the resource was replaced with the replacement resource comprise instructions to detect a first state change indicating that the resource has been disconnected followed by detecting a second state change indicating that the replacement resource has been connected to the portable computing system.

19. The at least one non-transitory machine-readable medium of claim 16, wherein the immersive gaming experience includes a gaming experience, and wherein the instructions to determine the resource level of the resource comprise instructions to determine that the resource level of the resource violates a threshold, and wherein the instructions further comprise instructions to alter the gaming experience when the resource violates the threshold.

20. The at least one non-transitory machine-readable medium of claim 19, further comprising instructions to:
determine that the replacement resource level of the replacement resource satisfies the threshold; and
alter the gaming experience when the replacement resource level satisfies the threshold.

21. The at least one non-transitory machine-readable medium of claim 19, further comprising instructions to alert the user that the resource violates the threshold.

* * * * *